United States Patent [19]

Swearingen

[11] 4,390,082
[45] Jun. 28, 1983

[54] RESERVE LUBRICANT SUPPLY SYSTEM

[75] Inventor: Judson S. Swearingen, Malibu, Calif.

[73] Assignee: Rotoflow Corporation, Los Angeles, Calif.

[21] Appl. No.: 217,572

[22] Filed: Dec. 18, 1980

[51] Int. Cl.³ .................. F02C 7/06; F01M 1/16
[52] U.S. Cl. .................. 184/6.4; 60/39.08; 184/6.11
[58] Field of Search .......... 60/39.08; 184/6.11, 184/6.4

[56] References Cited

U.S. PATENT DOCUMENTS

| | | | |
|---|---|---|---|
| 3,527,054 | 9/1970 | Hemsworth | 60/39.08 |
| 3,626,693 | 12/1971 | Guillot | 60/39.08 |
| 3,779,345 | 12/1973 | Barnes et al. | 60/39.08 X |
| 4,002,224 | 1/1974 | Easter | 60/39.08 X |
| 4,105,093 | 8/1978 | Dickinson | 184/6.11 |
| 4,153,141 | 5/1979 | Methlie | 184/6.4 X |
| 4,157,744 | 6/1979 | Capriotti | 184/6.4 X |
| 4,171,611 | 10/1979 | Hüeller | 60/39.08 |
| 4,309,870 | 1/1982 | Guest et al. | 60/39.08 |

Primary Examiner—David H. Brown
Attorney, Agent, or Firm—Lyon & Lyon

[57] ABSTRACT

A system for supplying lubricant under pressure to a rotary mounting system having bearings when the main pressurized lubricant supply system fails. The system includes a bladder or other expansible chamber in association with a lubricant reservoir. The bladder has a source of pressurized gas which is either inherently or through regulation maintained at a pressure below that of the main system and above that of the lubricant discharge from the bearings. The source of pressure for the reserve system may be pressure from a gas seal or from the rotor chamber of a pump or turbine. If regulated, the regulation may be by the main lubricant pressure or the pressure of the lubricant discharge. The system also contemplates accommodation for leaks and over pressures.

14 Claims, 3 Drawing Figures

RESERVE LUBRICANT SUPPLY SYSTEM

BACKGROUND OF THE INVENTION

The present invention relates to lubrication systems for machinery.

Pressurized lubricating systems have long been used with machinery employing bearings and the like to reduce the friction and wear between machinery parts sliding on one another. Many of these systems are incapable of operating for even a relatively short period of time without the lubricant in a pressurized state. Particularly with large and/or expensive machinery, reserve lubricant supply systems have been employed which provide the required pressurized lubricant during shutdown of the equipment. Often, a reserve reservoir of oil is pressurized on a standby basis by a reserve pump, an elevated location for the lubricant reservoir or a pressurized body of compressed gas.

A compressed body of gas is a most popular form of pressurizing mechanism and employs a vessel to act as the reserve oil reservoir, a bladder within the vessel, and pressurized nitrogen or the like in the bladder. The vessel is in communication with the main oil supply and, thus, is held under the same pressure as the main oil supply during nominal operation. The amount of gas contained within the bladder is such that a pressure equilibrium between the inside of the bladder and the surrounding vessel is reached with the bladder substantially deflated. When the main oil supply pressure fails, the bladder then expands as the pressure drops, and forces the reserve oil from the reserve vessel.

The foregoing system is normally adequate for a great many uses where competing pressures do not exist within the equipment. However, with large centrifugal pumps, turbines, turbo-expanders and the like, the bearings supporting the shaft thereof are subjected to external pressures from either the impeller cavity itself or from a pressurized gas seal between the cavity and the bearing. Under such conditions, a relatively high pressure must be maintained throughout the operation of the reserve lubricant system. With the bladder type system, as the bladder expands the pressure within the bladder drops. For example, an oil supply may be maintained at 1,000 p.s.i. which is used to supply a system requiring 950 p.s.i. Upon interruption of the 1,000 p.s.i. pressure, the expansion of the gas within the bladder from 1,000 p.s.i. to 950 p.s.i. displaces an amount of oil which is equal to only 5% of the volume of the gas prior to expansion. If the vessel is divided equally between oil reservoir volume and bladder volume, only 2.5% of the vessel's volume of oil is available in the usable range. If the vessel has a total capacity of ten gallons, the usable supply of oil at or above 950 p.s.i. is only one quart of oil. In the type of equipment in which such systems are employed, a normal rate of oil usage may be twenty gallons per minute. The bearing would thus be supplied with emergency oil for less than one second. A more normal shutdown time for such equipment is on the order of five to thirty seconds. Thus, reserve systems as described above are inadequate.

Naturally, substantial increases in the stored pressurized gas can effectively overcome the problem of rapid pressure loss in such systems. One such proposal is disclosed in U.S. Pat. No. 4,002,224, issued to Easter. However, it is not always advantageous or practical to maintain such a large source of pressurized gas.

SUMMARY OF THE INVENTION

The present invention is directed to a system for providing pressurized reserve lubricant where a substantial drop in the pressure of the reserve lubricant during its use cannot be tolerated. The system is employed in machinery where external pressure is applied to at least one side of a bearing such as in large pumps, turbines, turbo-expanders, or the like. The external pressure is employed by the reserve system in supplying relatively uniform pressure to the reserve oil supply. The pressure thus supplied to the reserve system may be regulated where necessary by critical pressure conditions within the main system, e.g., the pressure of the main lubricant supply or the pressure at the lubricant exhaust from the bearing or bearings. If pressures are relatively predictable in the main system, the regulation may be by a preset, fixed setting rather than as a function of one of the condition within the system.

It is contemplated that the present system is most useful with a rotary device, such as a centrifugal pump, which employs a pressurized gas seal to protect the bearings. Pressure from the seal may then be used as a source of pressure for the reserve lubricant system.

Accordingly, it is an object of the present invention to provide an improved reserve lubricant system. Other and further objects and advantages will appear hereinafter.

DETAILED DESCRIPTION OF THE PREFERRED EMBODIMENT

Figure 1:
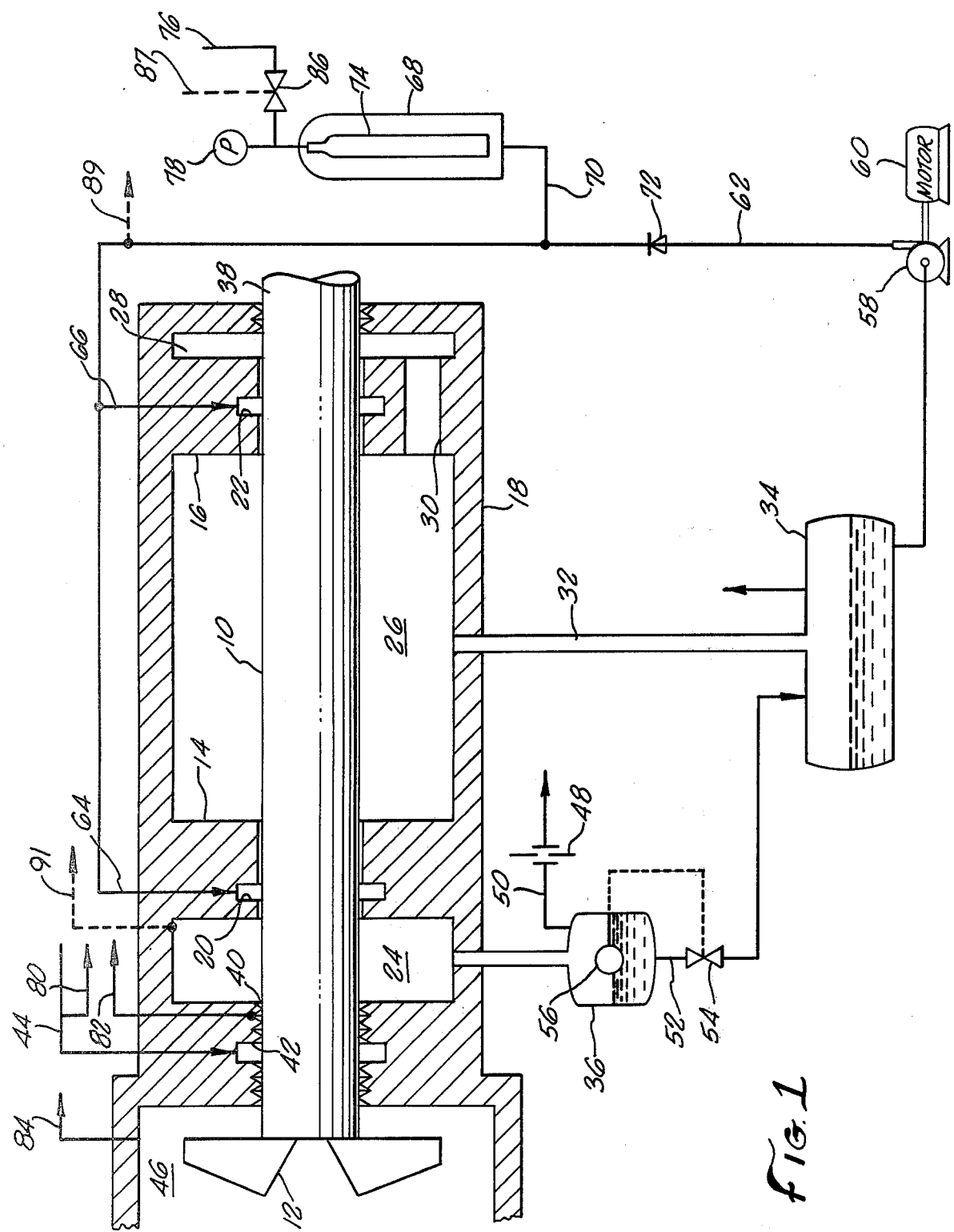
FIG. 1 is a schematic view of a device which may be employed with the present invention.

Turning in detail to the drawings and particularly FIG. 1, a typical mechanism is illustrated for employment with the present lubrication system. A main shaft 10 having a rotor 12 mounted at one end, thereof, is rotatably mounted in bearings generally designated 14 and 16, which form a part of an overall housing 18.

Each bearing 14 and 16 includes an annular cavity 20 and 22, into which pressurized lubricant may be forced. The pressurized lubricant will then flow, in the case of bearing 14, into chambers 24 and 26. In the case of bearing 16, the pressurized oil will flow along the main shaft 10 to chambers 26 and 28. Chambers 26 and 28 are connected by a passageway 30, and are allowed to drain via a conduit 32 into a main reservoir 34. The chamber 24 drains into a preservoir chamber 36.

Labyrinth seals are provided outwardly of each of the bearings 14 and 16. The labyrinth seal 38 outwardly of bearing 16 and chamber 28 is of simple construction. Labyrinth seal 40 outwardly of bearing 14 and chamber 24 includes a pressurized gas seal. The pressurized gas seal includes an annular cavity 42 which may be pressurized through line 44. Buffer gas is introduced through line 44 into the annular cavity 42 which is at a higher pressure than the prevailing pressure in the chamber 24 and in the rotor cavity 46 adjacent to the seal 38. In this way, a buffer gas may be selected which is compatible with both the lubricant flowing into the chamber 24 and the material being processed by the rotor 12.

Because of the relative pressure of the buffer gas, it will slowly be forced into both the chamber 24 and the rotor cavity 46. In most cases, the rotor cavity 46 determines the pressure at which the buffer gas must be maintained. If no pressure were maintained within the chamber 24, flow of the buffer gas into chamber 24 would be controlled only by the labyrinth seal 40. However, a restriction is placed on the outlet from the chamber 36 which has an effect of controlling this flow. As the chamber 24 only vents through the chamber 36, an orifice 48 may be used on a gas vent 50 to provide sufficient restriction to reduce the flow of gas from the annular cavity 42 into the chamber 36 through the labyrinth seal 40. A liquid outlet 52 must also be controlled for the chamber 36 to maintain the proper restriction to gas flow through the orifice 48. The liquid outlet 52 includes a valve 54 controlled by a float 56. As the chamber 36 fills with lubricant from the bearing 14, the float 56 rises and actuates the valve 54 such that an appropriate amount of lubricant is discharged through the liquid outlet 52 to the reservoir 34.

The pressurized main lubricant supply for the bearings 14 and 16 includes a pump 58 which may be conveniently driven by a motor 60 and draws lubricant from the main reservoir 34. The pressurized pump discharge is conveyed through line 62 to line 64 and 66 which in turn supply the annular cavities 20 and 22 of the bearings 14 and 16. Thus, during normal operation of the equipment, lubricant is forced by the pump 58 to flow in a continuous path to the clearances between the bearings 14 and 16 and the shaft 10, then into the several chambers 24, 26 and 28, to the reservoir 34 and then again to the pump 58. The pressure provided by the pump 58 must, of course, be sufficient to provide the requisite lubricating film in the bearings 14 and 16 and must also be higher than the pressure existing in the chamber 24. The latter condition is normally met by adjusting the pressure on the pump 58 rather than by varying the size of the orifice 48 associated with the gas vent 50.

In the event that the main lubricant supply system should fail, conventional devices associated with such systems have been employed to promptly shut down the mechanism, allowing it to coast to a stop. As the time required for shutdown may require from five to thirty seconds or more, a reserve lubricant supply is provided. The reserve lubricant supply is provided by a reserve lubricant reservoir 68 which is in open communication with the pressurized supply line 62 of the main lubricant system by means of a passageway 70. A check valve 72 is provided in the pressurized supply line of the main lubricant system to insure that the pressure and flow from the reserve lubricant reservoir 68 when activated will be toward the bearings 14 and 16. The volume of the reservoir 68 is sized to provide sufficient lubricant during the expected period of shutdown of the mechanism with which it is associated.

Located within the reserve lubricant reservoir 68 is a gas pressurized chamber which has an expansible wall common with the reservoir 68 so that the volume of the reservoir can be controlled by the gas pressure within the gas pressurized chamber. In the preferred embodiment, the gas pressurized chamber includes a bladder 74 of sufficiently resilient material such that it can be collapsed to substantially no volume or expanded to force lubricant from the reservoir 68. The change in volume of which the bladder 74 is capable should at least equal the volume of the lubricant required to maintain adequate lubrication of the bearings 14 and 16 during the expected shutdown. The bladder 74 is associated with a gas pressure source line 76. A pressure meter 78 provides easy monitoring of the pressure to the bladder 74.

To insure that adequate pressure will be provided to the bladder throughout the operation of the reserve lubricant supply system, the gas pressure source line 76 receives pressure from a continuous source of pressure associated with the mechanism. This continuous source of pressure may either be the pressurized gas seal or the rotor cavity of the lubricated machinery. If pressure is received from the pressurized gas seal, the pressure may be received from either the supply to the seal or at an intermediate point along the labyrinth seal 40 at a distance from the annular cavity 42. In the first case, pressure would be taken from line 80 associated with line 44 and in the second case pressure would be taken from line 82. Alternately, pressure existing in the rotor cavity may be employed via line 84. Depending on the selected pressure source, one of lines 80, 82 and 84 would be coupled with gas pressure source line 76 to supply gas to the bladder 74. Regardless of the source of pressure, the resulting pressure to the bladder 74 must be less than the pressure existing in the pressurized supply line 62 of the main lubricant supply system during normal operation thereof. This insures that the bladder 74 will be collapsed and the reserve lubricant reservoir 68 fully charged. This may be accomplished by insuring that the pressure takeoff from the pressurized gas seal or from the rotor cavity is at a location where the pressure derived therefrom will be lower than that in the line 62. Alternately, a regulator may be employed in the gas pressure source line 76.

If pressure is intended to be controlled by means of the takeoff location in the mechanism, instrumentation may be employed to insure that the maximum pressure of the pressurized gas seal is maintained at a level below the nominal pressure level of the main lubricant system. If the overall seal pressure is so maintained, the takeoff may be via line 80. If such is not the case, the takeoff may be via line 82 which insures a pressure drop from that of the supply pressure to the gas seal. Such an intermediate takeoff in the gas seal into insures that the pressure so derived will be above that of the chamber 24. It is of benefit to have the operative pressure for the bladder 74 be above that of the chamber 24 in order that lubricant will flow from the annular cavity 20 in the bearing 14 toward the chamber 24. If the gas pressure source is derived from the rotor cavity, the source may be moved radially inwardly or outwardly in that cavity to optimize the desired pressure.

If pressure regulation is employed in the gas pressure source line 76 to control operative pressure in the bladder 74, a regulator 86 may be employed. The regulator may be set at a fixed pressure or may be controlled through a line 87 by either the pressure existing in the supply line 62 of the main lubricant system through at tap 89 or the pressure existing in the chamber 24 through a tap 91. If the main lubricant supply pressure is employed for regulation, the regulator must be set to maintain pressure in the bladder 74 at a pressure below that of the regulating pressure. In the case of the chamber 24, the regulator must be set so that the pressure in the bladder 74 is higher than the regulating pressure. In either event, the pressure in the bladder 74 during normal operation of the main lubricant supply system is to be maintained at a pressure between the supply pressure of the main lubricant supply system and the discharge pressure existing in chamber 24.

Figure 2:
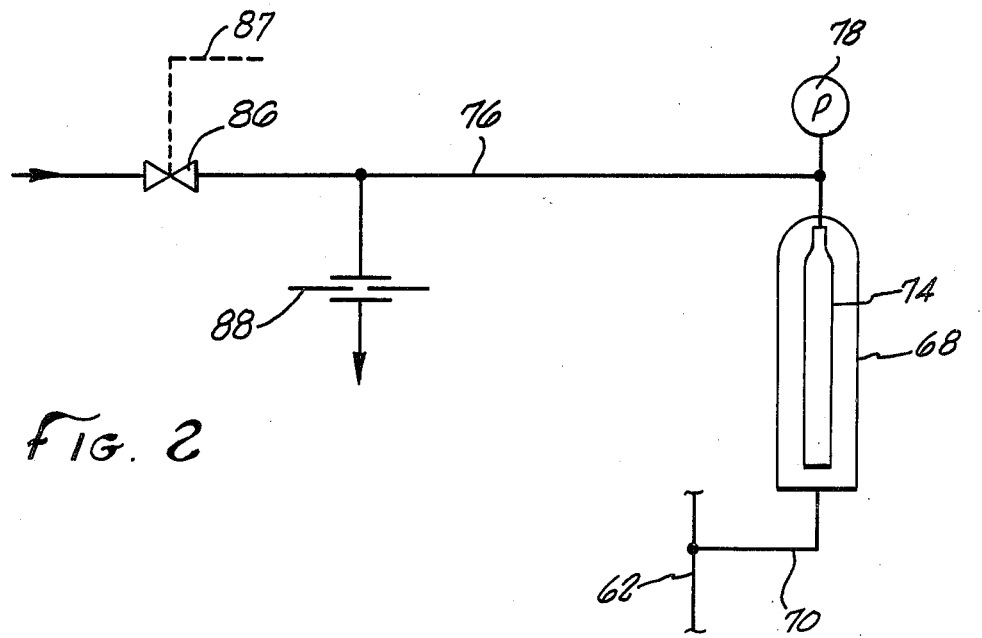
FIG. 2 is a schematic detail of one arrangement of the present invention.

Turning to FIG. 2, an additional element, orifice 88, is included in the system. This orifice accomodates temporary overpressure situations which may possibly occur. Without the orifice 88, an overpressure condition would simply be maintained by the regulator 86. With the orifice 88 slowly bleeding off pressure, the regulator 86 will be required to again periodically operate to supply more pressure to the reserve system. If the overpressure is a temporary condition, the regulator 86 will readjust to the appropriate pressure level. To provide a slow bleed off of pressure, the orifice 88 preferably provides a restriction to flow which is substantially greater than the total effective restriction between the bladder 74 and the source of pressurized air. Thus, the orifice cannot significantly reduce the flow to the bladder 74 when needed.

Figure 3:
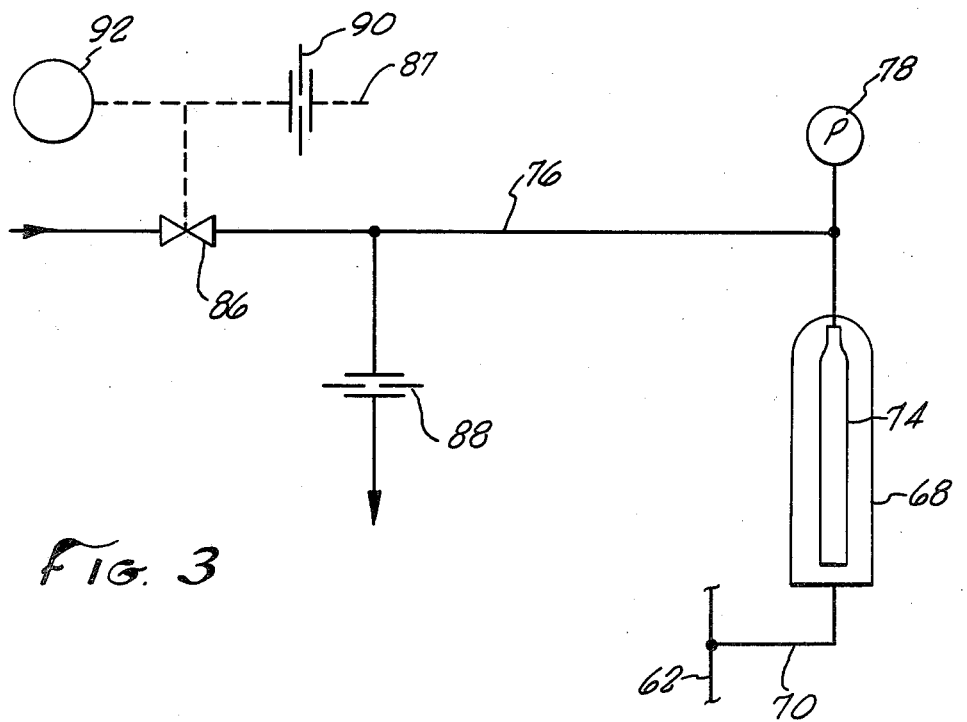
FIG. 3 is a schematic detail of another arrangement of the present invention.

FIG. 3 also illustrates additional equipment associated with the reserve lubricant supply system. Associated with the regulator 86 is a gas reservoir 92. The combination of the orifice 90 and the reservoir 92 help to overcome any leaks which may exist in the system by delaying the loss of pressure and buffer and delay any change in pressure in gas supply to the bladder 74.

Thus, to briefly describe in review the operation of the present system, a main lubricant supply system is employed to distribute lubricant to a mechanism. As it is operating normally, it will supply lubricant to the reserve lubricant supply system and collapse the bladder 74 which is maintained at a pressure below that of the supply line of the main lubricant supply system. The maintenance of the pressure in the bladder 74 is undertaken either by insuring the pressure delivered to the bladder never exceeds that of the lubricant supply by employing sources of pressure such as the gas seal and the rotor cavity at points where the pressure does not rise above that of the lubricant supply or by regulation of the pressure as measured by the main lubricant supply pressure or the pressure of the lubricant discharge from the bearing.

When the main system fails, the mechanism is shut down, and during the shutdown period the check valve 72 automatically closes and the pressure supplied to the bladder 74 forces pressure into the main lubricant supply line from the reserve system and into the bearings. As the source of pressure is not immediately exhausted, the full expansion of the bladder 74 will occur at pressures which are required to adequately supply the bearings. In this way, a failure of the main lubricant supply system can occur without damage to the mechanism being lubricated.

Thus, an improved reserve lubricant supply system has been disclosed. The present embodiments of this invention are to be considered as illustrative and not restrictive, the scope of the invention being indicated by the appended claims rather than by the foregoing description and all changes which come within the meaning and range of equivalency of the claims therefore are intended to be embraced therein.

I claim:

1. In a mounting system having a lubricated bearing, a pressurized area on a first side of the lubricated bearing, a vent for the pressurized area between the pressurized area and the bearing and a pressurized main lubricant supply system, a reserve lubricant supply system comprising a reserve lubricant reservoir, a passage between said reserve lubricant reservoir and the pressurized supply of the main lubricant supply system, a gas pressurized chamber having an expansible wall common to said reservoir and a gas pressure source line in communication with said gas pressurized chamber, said source line receiving pressure from the pressurized area.

2. The reserve lubricant supply system of claim 1 wherein said pressurized area is a pressurized gas seal.

3. In a rotary mounting system having a lubricated bearing, a pressurized gas seal on a first side of the lubricated bearing, a vent for the pressurized gas seal between the seal and the bearing and a pressurized main lubricant supply system, a reserve lubricant supply system comprising a reserve lubricant reservoir, a passage between said reserve lubricant reservoir and the pressurized supply of the main lubricant supply system, a gas pressurized chamber having an expansible wall common to said reservoir and a gas pressure source line in communication with said gas pressurized chamber, said source line receiving pressure from the gas seal.

4. The reserve lubricant supply system of claim 3 wherein said gas pressure source line is directly coupled to the pressurized gas seal.

5. The reserve lubricant supply system of claim 3 wherein said gas pressure source line is coupled between the pressurized gas seal and the vent.

6. A reserve lubricant supply system of claim 3, 5 or 6 wherein said gas pressure source line includes a regulator valve.

7. The reserve lubricant supply system of claim 6 wherein said regulator valve is constructed and arranged to be controlled by the pressure existing in the vent to maintain a pressure in said gas pressure source line above the pressure in the vent.

8. The reserve lubricant supply system of claim 6 wherein said regulator valve is constructed and arranged to be controlled by the pressure existing in the pressurized supply of the main lubricant supply system to maintain a pressure in said gas pressure source line below the pressure in the pressurized supply of the main lubricant supply system during nominal operation.

9. The reserve lubricant supply system of claim 6 wherein said gas pressure source line includes a bleed-off orifice having a flow restriction substantially greater than the total effective restriction between said gas pressurized chamber and the source of gas seal pressure to said gas pressure source line with said regulator valve open.

10. In a rotary mounting system for an impeller and having a lubricated bearing and a pressurized main lubricant supply system, a reserve lubricant supply system comprising a reserve lubricant reservoir, a passage between said reserve lubricant reservoir and the pressurized supply of the main lubricant supply system, a gas pressurized chamber having an expansible wall common to said reservoir and a gas pressure source line in communication with said gas pressurized chamber, said source line receiving pressure from the adjacent impeller.

11. The reserve lubricant supply system of claim 10 wherein said gas pressure source line includes a regulator valve.

12. The reserve lubricant supply system of claim 11 wherein said regulator valve is in communication with the pressure supply of the main lubricant supply system and is designed and constructed to regulate said line to a pressure below the pressure supply of the main lubricant supply system.

13. The reserve lubricant supply system of claim 6 wherein said regulator valve includes a regulator supply line, said regulator supply line including an orifice restricting flow through said regulator supply line and a reservoir in communication with said regulator supply line between said orifice and said valve.

14. The reserve lubricant supply system of claim 12 wherein said regulator valve includes a regulator supply line, said regulator supply line including an orifice restricting flow through said regulator supply line and a reservoir in communication with said regulator supply line between said orifice and said valve.

* * * * *